(12) United States Patent
Love et al.

(10) Patent No.: US 9,787,705 B1
(45) Date of Patent: Oct. 10, 2017

(54) EXTRACTING INSIGHTFUL NODES FROM GRAPHS

(71) Applicant: Quid, Inc., San Francisco, CA (US)

(72) Inventors: Oriana Jeannette Love, Alameda, CA (US); Ruggero Altair Tacchi, San Francisco, CA (US); Ping Chen, San Francisco, CA (US)

(73) Assignee: Quid, Inc., San Francisco, CA (US)

( * ) Notice: Subject to any disclaimer, the term of this patent is extended or adjusted under 35 U.S.C. 154(b) by 0 days.

(21) Appl. No.: 15/241,447

(22) Filed: Aug. 19, 2016

(51) Int. Cl.
  *G06F 11/00* (2006.01)
  *H04L 29/06* (2006.01)
  *G06F 17/30* (2006.01)

(52) U.S. Cl.
  CPC .... *H04L 63/1425* (2013.01); *G06F 17/30713* (2013.01); *G06F 17/30958* (2013.01)

(58) Field of Classification Search
  CPC .......... H04L 63/1425; G06F 17/30713; G06F 17/30958
  See application file for complete search history.

(56) References Cited

U.S. PATENT DOCUMENTS

| | | | | |
|---|---|---|---|---|
| 8,626,835 B1 * | 1/2014 | Gyongyi | ........... | G06F 17/30598 709/204 |
| 2004/0139067 A1 * | 7/2004 | Houle | ................ | G06F 17/30011 |
| 2011/0060983 A1 | 3/2011 | Cai et al. | | |
| 2011/0238408 A1 * | 9/2011 | Larcheveque | ...... | G06F 17/2785 704/9 |
| 2012/0173541 A1 * | 7/2012 | Venkataramani | ... | G06F 17/3048 707/747 |
| 2012/0278321 A1 * | 11/2012 | Traub | ................ | G06F 17/30657 707/736 |
| 2014/0075004 A1 | 3/2014 | Van Dusen et al. | | |
| 2014/0098101 A1 * | 4/2014 | Friedlander | ....... | G06F 17/30587 345/440 |
| 2014/0280224 A1 * | 9/2014 | Feinberg | ........... | G06F 17/30958 707/748 |
| 2014/0379716 A1 * | 12/2014 | Branch | ..................... | G06F 8/76 707/738 |

(Continued)

OTHER PUBLICATIONS

'Latent Dirichlet allocation', https://en.wikipedia.org/wiki/Latent_Dirichlet_allocation, Wikipedia, Jul. 31, 2016, pp. 1 to 13.

(Continued)

*Primary Examiner* — Techane Gergiso
(74) *Attorney, Agent, or Firm* — Pillsbury Winthrop Shaw Pittman LLP

(57) ABSTRACT

Provided is a process, including: obtaining a clustered graph, wherein each of the nodes has a plurality of respective node attributes other than an identifier of the node; obtaining a designation of a given node attribute from among the plurality of node attributes; identifying a first subset of nodes of the graph as having anomalous values of the given node attribute by comparing values of the given node attribute in the first subset to a distribution of the given node attribute; identifying a second subset of nodes of the graph as having representative values of the given node attribute by comparing values of the given node attribute in the second subset to the distribution of the given node attribute; and sending instructions to a client device to display a representation of the graph.

20 Claims, 5 Drawing Sheets

(56) References Cited

U.S. PATENT DOCUMENTS

| | | | |
|---|---|---|---|
| 2015/0019639 A1* | 1/2015 | Marlow | G06Q 50/01 709/204 |
| 2015/0127650 A1* | 5/2015 | Carlsson | G06F 17/30663 707/737 |
| 2015/0213370 A1* | 7/2015 | Chakrabarti | G06Q 50/01 706/52 |
| 2015/0286709 A1 | 10/2015 | Sathish et al. | |
| 2015/0339835 A1* | 11/2015 | Mohr | G06T 11/206 345/440 |
| 2015/0347559 A1* | 12/2015 | Elias | G06F 17/30958 707/737 |
| 2016/0042061 A1 | 2/2016 | Sengupta et al. | |
| 2016/0103932 A1 | 4/2016 | Sathish et al. | |
| 2016/0110434 A1* | 4/2016 | Kakaraddi | G06F 17/30958 707/602 |
| 2016/0140234 A1 | 5/2016 | Van Den Broek et al. | |
| 2016/0253696 A1* | 9/2016 | Gui | G06Q 30/0243 |
| 2016/0292303 A1* | 10/2016 | Hong | G06F 17/30598 |
| 2016/0292324 A1* | 10/2016 | Leonard | G06F 17/5009 |

OTHER PUBLICATIONS

'Latent semantic analysis', https://en.wikipedia.org/wiki/Latent_semantic_analysis, Wikipedia, Jul. 14, 2016, pp. 1 to 17.

'Voyant Tools Documentation', http://docs.voyanttools.org/tools/links/, Aug. 19, 2016, pp. 1 to 6.

'TopicNets: Visual Analysis of Large Text Corpora with Topic Modeling', ACM Transactions on Intelligent Systems and Technology 3(2), Article 23, Feb. 2012, pp. 1 to 26.

* cited by examiner

US 9,787,705 B1

EXTRACTING INSIGHTFUL NODES FROM GRAPHS

BACKGROUND

1. Field

The present disclosure relates generally to graph analysis and, more specifically, to automatically extracting insightful nodes from graphs.

2. Description of the Related Art

Graphs are powerful data models for understanding systems in which relationships between entities are important. Examples include graphs characterizing relationships between documents, like semantic similarity between each document in a corpus, such as news articles published in a given decade, or between websites, or between scientific journal articles. Other examples include graphs characterizing relationships between other entities, like between companies, countries, or people, such as graphs relating exchanges there between or similarities there between.

Such graphs, however, can be difficult for humans to interpret, as the amount of information contained can massively exceed the capabilities of human cognition. Many typical applications have well in excess of 1,000 nodes and well in excess of 5,000 edges between those nodes. Lacking adequate tools for synthesizing knowledge from such data structures, many analysts fail to discover useful insights buried in graphs.

SUMMARY

The following is a non-exhaustive listing of some aspects of the present techniques. These and other aspects are described in the following disclosure.

Some aspects include a process, including: obtaining a clustered graph, wherein each of the nodes has a plurality of respective node attributes other than an identifier of the node; obtaining a designation of a given node attribute from among the plurality of node attributes; identifying a first subset of nodes of the graph as having anomalous values of the given node attribute by comparing values of the given node attribute in the first subset to a distribution of the given node attribute; identifying a second subset of nodes of the graph as having representative values of the given node attribute by comparing values of the given node attribute in the second subset to the distribution of the given node attribute; and sending instructions to a client device to display a representation of the graph.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
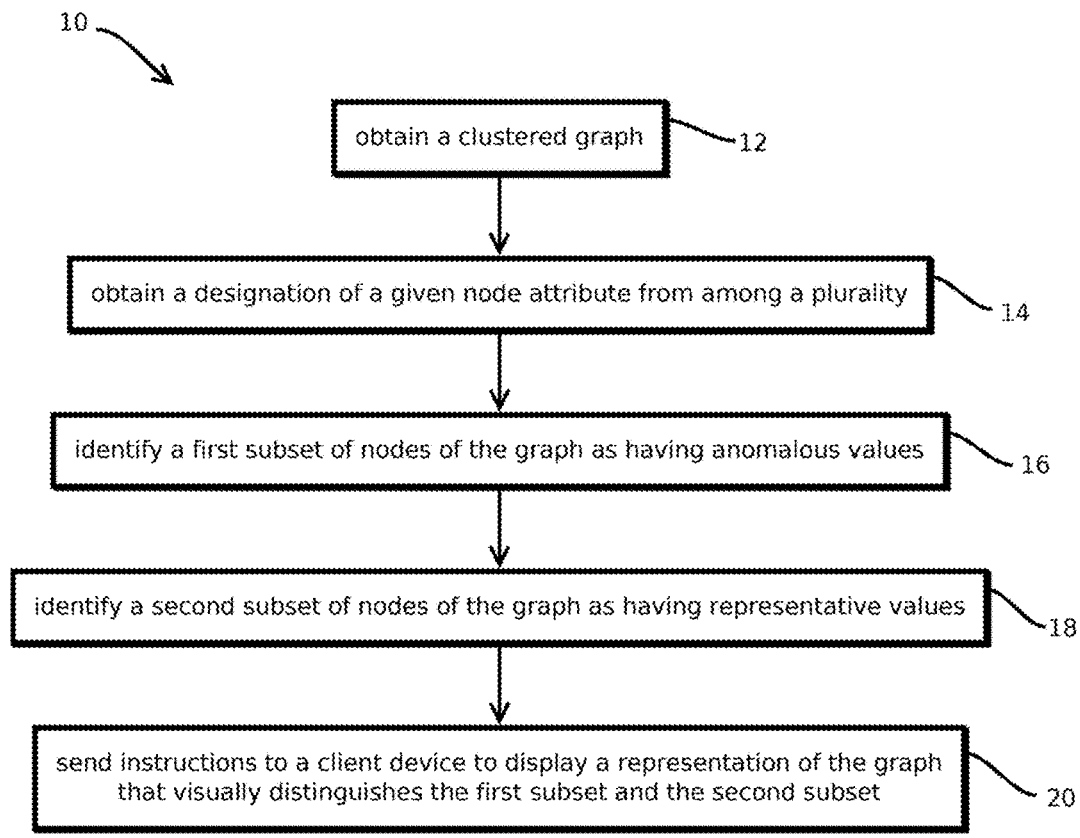
FIG. 1 illustrates an example of a process by which insightful nodes in a graph may be identified, in accordance with some embodiments of the present techniques.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the fields of computer science and human-computer interaction. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Some embodiments identify "insightful" attributes of nodes in graphs (e.g., attributes exhibiting anomalous or representative behavior relative to the graph population of node metadata or edge properties). Some embodiments may identify such attributes and identify nodes and clusters having anomalous or representative values with respect to such attributes. In some embodiments, such calculations may be computationally infeasible if performed with naive, brute force techniques, with available computing resources, subject to user expectations for latency, with commercially relevant sized graphs. To expedite operations, and improve upon the operation of computer systems, some embodiments may construct probability models that model distributions of measures of central tendency (e.g., means, modes, or medians) of attributes, e.g., based on combinatorics according to cluster measures of central tendency, variance, and sizes of the clusters in the graph. The present techniques are described with respect to document relationship graphs, but these approaches are also useful in other domains in which graphs exist, e.g., in graphs between entities other than documents, like people, companies, objects, places, etc.

For instance, in some cases, the user or system administrator may explicitly define node metadata and edge properties of interest to the user. For example, the following may be defined as of interest for the nodes (e.g., articles) within a semantic similarity network: a) node metadata, like social sharing count; and b) node edge properties, like degree, bridges to another topic, etc.

But in many cases, the appropriate attributes to select to reveal interesting nodes are not readily apparent. Accordingly, some embodiments may automatically identify these attributes (e.g., node metadata or edge properties). If node metadata and edge properties of interest have not been defined, some embodiments automatically determine potentially insightful attributes.

This may including determining insightful node metadata attributes. To this end, some embodiments may execute the following pseudocode routine:

for each node metadata attribute (as defined by the data)
  //1. determine insightful node attributes
    calculate the <variance> of that attribute's values
    if variance exceeds some threshold then the metadata attribute is a candidate to reveal "insight" select the top X node metadata attributes as insightful metadata attributes, where X is a threshold integer configured by the user.
  //2. determine representative nodes
    calculate the average value of the attribute
    select a node that is close to this average as being representative Further, some use cases may include determining insightful nodes based on edge properties of interest for each edge property (as defined by graph properties) with the following pseudocode routine:

//1. determine insightful nodes based on insightful edges
  calculate the <variance> of that property's values
  if variance exceeds some threshold then the edge property is a candidate to reveal "insight"
  select the top X candidates as insightful metadata attributes, again where X is a user configured integer value.
//2. determine representative nodes based on edge properties
  calculate the average value of the edge attributes
  select a node that is close (e.g, within a threshold, or closest) to this average as being representative.

Some embodiments may determine insightful attributes and nodes exhibiting interesting values of those attributes on a cluster-by-cluster basis.

In a graph (also referred to as a network) of 1000 nodes or more, there are typically at least 15 or more clusters. Some embodiments may identify clusters with possibly interesting properties that can be analyzed further. Some embodiments use distributions to statistically define clusters that may be anomalies in that network. More specifically, some embodiments use a particular attribute cluster median in a network to identify an anomaly in a cluster. In a network, each cluster typically has a number of nodes, and each node would have a set of attributes associated with it depending on the type of network.

For example, a company network may have an attribute such as total investment amount for each company. Each cluster in that network may have a median for that attribute, so each cluster would have a total investment amount median. Theoretically, a distribution for the cluster median of that attribute would exist. The distribution may represent a frequency table of the possible occurrence of different cluster median in that cluster, so it is showing that if an embodiment created all the possible different combinations of nodes for a cluster of that size how often would different cluster medians occur in different combinations.

For instance, with a cluster of 5 nodes, then some embodiments go through all the possible combinations of 5 nodes from that network. Each different combinations of that cluster has its cluster median, and the distribution of those medians shows the frequency of different cluster median from all the possible combinations of that cluster size.

Thus, some embodiments may count different possible combinations of a cluster in a network to create a true distribution of a cluster median, or some embodiments may create a probability model for a cluster median in a network, e.g., by sampling the possible combinations. The probability model may depend on the actual cluster median and the size of each cluster in the network. In some embodiments, the model presents a probability of getting a cluster median that is less than the actual cluster median.

For example, if the model outputs 0.921, then you can interpret it as 92.1% of the cluster medians from the true distribution of that cluster median would be less than the cluster's actual median from the network. With this value, some embodiments identify an outlier probability depending on the context of the network.

The computation of the model may be reduced to a calculation based on combinatorics. In testing, the probability model has been validated through a simulation of the cluster median's true distribution. In 10,000 data points of an attribute sampled from an existing network with its individual clusters. The 10,000 data points from each cluster create a simulated distribution of the cluster medians, and the number of cluster medians that are less than the actual cluster median of the network in the simulated distribution divided by the total number of cluster medians (10,000 in this case) gives the percentage of having a cluster median less than the actual cluster median. This is the same probability from the probability model above. The difference between the simulation probability and the model probability in some tests is less than 3 decimal points, so the probability model is expected to be a valid form of calculating the probability of getting a cluster median less than the actual cluster median from the network. These techniques are illustrated in greater detail in the figures.

In some embodiments, a process 10 illustrated by FIG. 1 may be executed by the computational linguistics system described below with reference to FIG. 3, for instance, implemented on one or more instances of the computer system described below with reference to FIG. 5. In some cases, the process of FIG. 1, and the other processes described herein may be encoded as program code on a tangible, non-transitory, machine readable media, for instance as program code that when executed effectuate the operations described. The steps of these processes need not all be performed, nor need the steps be performed in the order recited, and in some cases, some or all of the steps may be executed concurrently on multiple instances of the computing system to expedite operations, none of which is to suggest that any other feature described herein is not amenable to similar variation.

Figure 2:
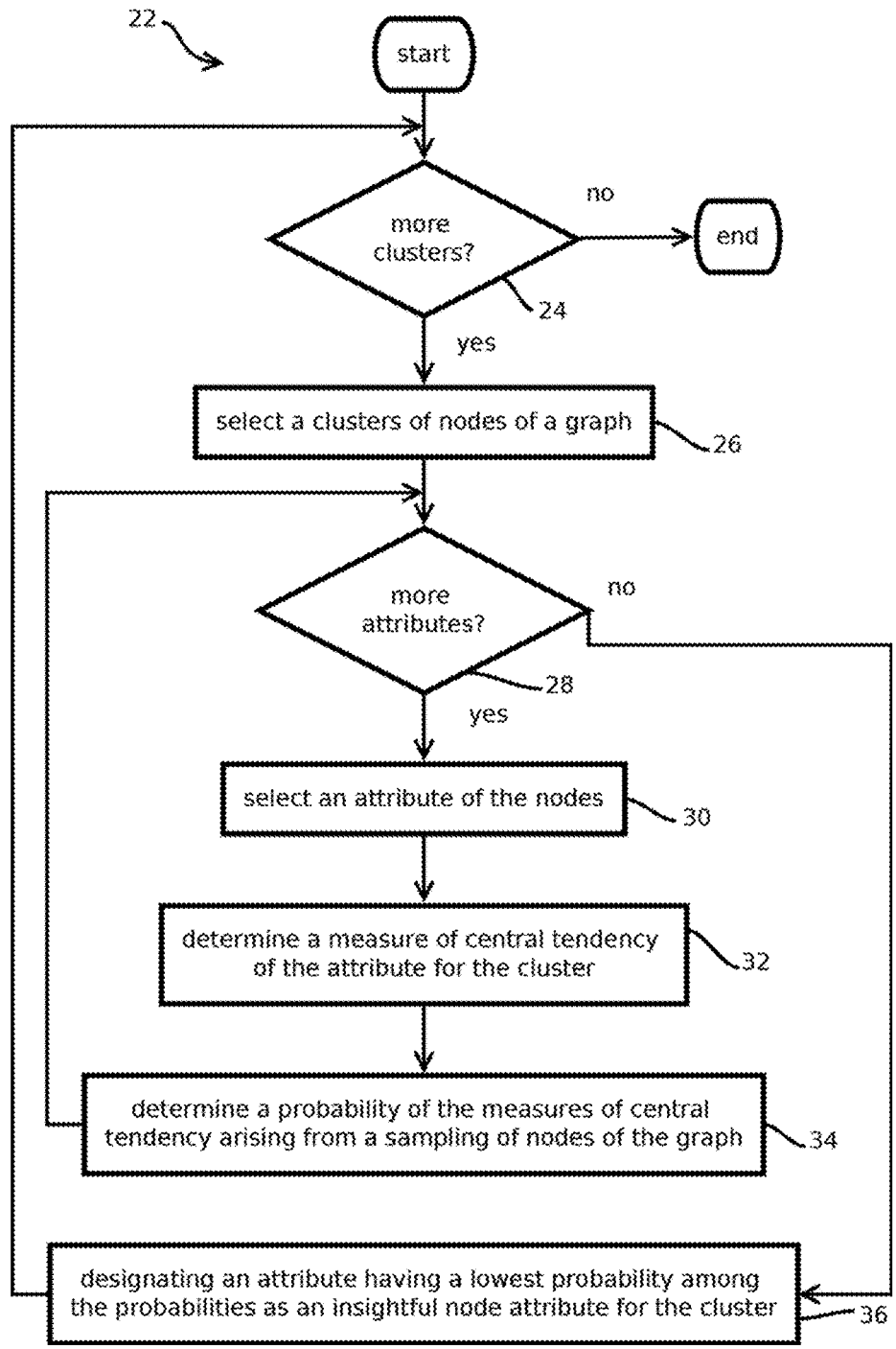
FIG. 2 illustrates an example of a process by which attributes indicative of insightful nodes may be identified, in accordance with some embodiments of the present techniques.

In some embodiments, the process 10 may identify attributes indicative of insightful nodes, for instance via the process of FIG. 2 or the above describe techniques, and then designate those insightful nodes before forming a graphical representation of a clustered graph that calls attention to those insightful nodes.

In some embodiments, the process 10 begins with obtaining a clustered graph, as indicated by block 12. In some cases, the clustered graph may include a relatively large number of nodes, each node corresponding to some entity, document, or other item. In some embodiments, the graph may include more than 1000 nodes, more than 5000 nodes, and in many commercially relevant implementations, as many as 100,000 nodes or more. In some embodiments, the edges of the graph may also be obtained, and each edge may connect a respective pair of the nodes. In some embodiments, the edges are weighted edges, with scores indicating the strength of relationships between the nodes. In some embodiments, the number of edges may also be relatively large, for instance, more than two, three, or ten times the number of nodes included. In some cases, every single node may be connected to every other node, for instance, in a data structure referred to below as an adjacency matrix, or some embodiments may operate upon pruned graphs where weaker connections have been removed.

In some cases, the relationships between the nodes may depend on what the nodes represent and the use case. In some embodiments, the relationships are relationships between documents, such as similarity of semantic content of unstructured text, similarity of sentiment, similarity of various topics that may be addressed, and the like, examples of which are described in greater detail below with reference to FIG. 3. In other examples, the graph nodes may represent various non-document entities, such as people, governments, geographic regions, countries, demographic groups, and the like. In some cases, the relationships between these entities, for instance encoded, as edge weights, may include things like transactions between the entities, such as frequency or magnitude of transactions, co-occurrences of entities, similarities between entities, dissimilarities between entities, and the like.

In some embodiments, each edge may include multiple weights, and in some cases, the edges may be directed edges with the weights having a value that implies one node is acting upon the other. In some cases, different types of edges may be included, such as edges representing semantic similarity, edges representing similarity of sentiment, and cross-citation edges indicating if one document cites the other.

In some embodiments, each node may be associated with a relatively large number of attributes, such as more than 5, more than 10, more than 100, or more than 1000 in some cases. Generally, the attributes of a node are distinct from the identifier of the node and may include things like edge properties of edges connected to the node and attributes of the item represented by the node. For example, such non-edge property attributes may include things like an amount of times a document represented by the node was shared on a social media network, an amount of times a document was commented upon, an amount of times a document was edited, an amount of times a document mentions a particular n-gram, a topic score or set of topics scores for a particular document, and the like. In some cases, where the nodes represent nondocument items, the attributes may be similarly various, examples including, for nodes representing businesses, measures of the performance of the business, like profitability, revenue, amount of funding raised, employee count, employee turnover, market rank, markets served, geolocation, and the like. Or for nodes representing individuals, attributes may represent interests, occupation, age, income, and the like.

In some cases, the graph may be a clustered graph in which collections of nodes are grouped into clusters according to various criteria, such as based on edges connecting the nodes. In some cases, clusters may be clustered according to a graph clustering algorithm, like a Markov cluster algorithm. Some embodiments may randomly walk the graph, e.g., with probabilities weighted according to edge weights, and record other nodes visited, in some cases including self-referential edges. Based on these random walks, some embodiments may form a transition probability matrix indicating the probability of traveling from one node to another. Some embodiments may normalize the transition probability matrix. Some embodiments may then iteratively expand the matrix by taking the eth power of the matrix and then inflate the matrix by taking the inflation of the resulting matrix according to a configurable parameter. Some embodiments may repeat these iteration until the matrix converges to reveal clusters according to positive values along rows of the converged matrix.

In some embodiments, the graph may include a relatively large number of clusters, such as more than five, more than 10, more than 100, or more than 1000, with each cluster including various numbers of nodes, such as more than three, more than five, more than 10, or more than 100. In some embodiments, the graph may be obtained and clustered according to the techniques described below with reference to FIG. 3. Some embodiments may include a set of clusters, and each cluster may be associated with a set of nodes designated as belonging to that respective cluster.

Next, some embodiments may obtain a designation of a given node attribute from among a plurality, such as a plurality of the nodes attributes, as indicated by block 14. In some cases, the designation may be supplied by an analyst or administrator, for instance, by explicitly designating a particular attribute among a list of the attributes, for example, as presented remotely on a client computing device in a selectable list. In other cases, the designation may be inferred by detecting nodes deemed insightful, e.g., based on the measures described herein. Examples of attribute insightfulness are described above and in greater detail below. In some cases, different attributes may be designated for the different clusters, or some embodiments may apply the same attribute to multiple clusters or all of the clusters. In some cases, the given node attribute may be an edge property of a node, like a number of connections to other nodes, a number of connections to the nodes in other clusters, a percentage of connections to nodes in other clusters relative to all connections, a measure of central tendency of edge weights of connected edges, a variance of edge weights of connected edges, an edge that connects between topics, and the like. In other examples, the attribute may be one of the above-described non-edge property attributes.

Next, some embodiments may identify a first subset of nodes of the graph as having anomalous values, as indicated by block 16. In some embodiments, a value may be deemed anonymous in response to that value falling with an outlier portion of a distribution of the attributes values, for instance, within the cluster or within the graph. For example, some embodiments may designate as anomalous those nodes having attribute values more than three standard deviations above a mean or more than three standard deviations below the mean. In some cases, the first subset may be subdivided into those nodes having outliers on a high side and those nodes having outliers on the low side, and some embodiments may graphically represent these two groups differently in subsequent steps. In some embodiments, other distributions may be encountered, and anomalous values may be designated with similar techniques, for instance, by determining which portion of that distribution corresponds to less than a threshold percentage, such as less than 0.01% of a distribution. Examples of other distributions expected to be encountered include power law distributions, binomial distributions, and Bernoulli distributions.

In some cases, attributes may be designated according to attributes standing alone and interactions between attributes, e.g., the ratio of pairwise combinations of attributes. In some cases, attributes may be identified by generating an attribute vector for each node, with the attribute values corresponding to dimensions in the attribute vector space. Some embodiments may execute a density based clustering algorithm, like the variants of DB-SCAN described below and designate those nodes having outlier attribute vectors outside of the resulting clusters in attribute-vector space as interesting nodes. Similarly, some embodiments may designate those near a centroid of the clusters in attribute-vector space as interesting for being representative.

In some cases, the identification of the first subset may include operations that are performed concurrently on multiple threads or multiple computing devices, for instance, by dividing the nodes of the graph among a plurality of computing devices (e.g., with frameworks like Apache Spark or Hadoop), and having each of the plurality of computing devices report back the portion of the assigned nodes that qualify as anomalous, thereby expediting operations relative to single threaded processes, though embodiments are also consistent with single threaded processes.

Next, some embodiments may identify a second subset of nodes of the graph as having representative values, as indicated by block 18. Nodes may be designated as representative based on those nodes having an attribute value closest to a measure of central tendency of the attribute, for instance, for the cluster, or for the graph. For example, some embodiments may determine which node has a closest value to a mean value of the attribute for the cluster or for the graph. In other embodiments, the representative nodes may be selected, for instance randomly, among a set of nodes within some threshold of a measure of central tendency, for instance within plus or minus one half of one standard deviation of a mean of a distribution of the designated node attribute. Again, in some embodiments, this process may be performed concurrently using techniques similar those described with reference to block 16.

Next, some embodiments may send instructions to a client device to display a representation of the graph that visually distinguishes the first subset and the second subset, as indicated by block 20. Examples of a graphical representation of the graph are described below with reference to FIG. 4. In some cases, the graph may visually represent clusters of the nodes, in some cases showing the nodes, or in other cases not showing the nodes, to make the image easier to visually parse, though embodiments are consistent with the techniques. In some embodiments, the first subset of nodes may be visually identified differently depending upon whether the members of the first subset are outliers on a high side or outliers in a low side. Similarly, some embodiments may visually distinguish members of the first subset for members of the second subset, and members of both subsets from the clusters. In some cases, the graphical representation may be sent for display in a web browser, for instance encoded with instructions that engage a graphics processing unit for faster rendering.

As noted, insightful attributes may be identified with a variety of techniques, including graph wide and on a cluster by cluster basis. FIG. 2 shows an example of a process 22 that in some cases identifies insightful attributes on a cluster by cluster basis. In some embodiments, the result of FIG. 2 may constitute the designation of a given attribute in block 14 of FIG. 1. In some embodiments, the process of FIG. 2 may occur in the pipeline of FIG. 1, for instance after obtaining a clustered graph in block 12, and as part of obtaining a designation of a given node attribute in block 14.

In some embodiments, the process of FIG. 2 may include determining whether all clusters in a clustered graph have been processed, as indicated by block 24. Upon determining that all clusters have been processed, the process may terminate, for instance by proceeding to block 14 of FIG. 1. Alternatively, in some embodiments, some iterations may proceed to select a cluster of nodes of the graph, as indicated by block 26. In some cases, some embodiments may iterate through a list of clusters, or some embodiments may assign clusters to different computing processes, such as different threads on a single machine, or different processes on different computing devices, for concurrent analysis of the clusters and faster operation using the techniques described above, though embodiments are consistent with single threaded processes.

Next, some embodiments may determine whether all attributes of the selected cluster have been process, as indicated by block 28. Upon determining that at least some attributes have not been processed, some embodiments may proceed to block 30 and select an attribute of the nodes, such as an attribute that has not yet been processed. Some embodiments may also parallelize this an subsequent operations, for instance by assigning different attributes of the cluster to different threads or different computing devices for concurrent analysis and those processes may report back the various probabilities described below, e.g., to a master node of a compute cluster.

Next, some embodiments may determine a measure of central tendency of the attribute for the cluster, as indicated by block 32. A variety of different measures of central tendency may be determined, such as a mean, a mode, or a median value. In some cases, for instance where the clusters are relatively large, determining a measure of central tendency may include estimating a measure of central tendency, for instance by randomly sampling among members of the cluster, for instance more than 20 or more than 50, to estimate the measure of central tendency for the population.

Some embodiments may also determine an amount of variation of the attribute, for instance, for the cluster, and select those attributes having a relatively large variation, for instance relative to other clusters. For example, some embodiments may also determine a standard deviation or variance of the attribute for the cluster and compare that value to the variance or standard deviation of other clusters. Some embodiments may then select those attributes having the largest or smallest standard deviation relative to those of other clusters, for example, by normalizing against a mean standard deviation for the graph as a whole.

Next, some embodiments may determine a probability of the measures of central tendency arising from a random sampling of nodes of the graph, as indicated by block 34. For example, some embodiments may determine a number of nodes in the respective cluster. Some embodiments may then determine every combination of nodes in the graph as a whole of the same size and, for each combination, calculate a respective measure of central tendency to create a population of measures of central tendency, e.g., a distribution of means, medians, or modes. Some embodiments may then determine where the measure of central tendency obtained in block 34 falls within this population, for instance, based on statistics of that population, like a mean and standard deviation. For example, some embodiments may determine that the measure of central tendency from block 34 is larger than 99.5% of the measures of central tendency in the population obtained in step 34, thereby indicating that the measure of central tendency in block 32 is relatively unlikely to arise from arbitrary selections of nodes. Similarly, some embodiments may determine that the measure of central tendency from block 32 is smaller than all but 1% of the population of measures of central tendency obtained in the processes of block 34, thereby similarly indicating that the measure of central tendency in block 32 is relatively improbable. In some cases, this probability may be stored in memory for comparison with probabilities of other attributes of the respective cluster to select the most improbable attributes.

In some embodiments, determining measures of central tendency for every combination of nodes in the graph of the size of the cluster at issue may be too computationally expensive to be completed in a reasonable amount of time, such as less than one hour. For example, the number of combinations may scale relatively poorly with the number of nodes, for instance as a binomial coefficient. To expedite operations and cause the computer to reach a result faster, some embodiments may sample among these combinations, for instance randomly (e.g. pseudo-randomly, like according to a linear shift register selecting among note identifiers) selecting nodes of the graph (including nodes outside of the cluster at issue) until an amount equal to that of the size of the cluster at issue is selected to form a sample instance, and a measure of central tendency may be calculated for that sample instance. This process may be repeated to create a sample set of measures of central tendency, and some embodiments may statistically model that distribution, for instance by calculating a mean and standard deviation, which may be used by some embodiments to determine the probability of the measure of central tendency obtained in block 32 with statistical inference, e.g., means for the cluster more than three standard deviations from the mean of means for the samples may be deemed indicative of insightful attributes.

Upon determining the probability of observing the measure of central tendency calculated in block 32 for the cluster at issue, based on distributions of such measures for other collections of a similar size within the graph, some embodiments may return to the determination of block 28 and ascertain whether attributes remain that have not yet been analyzed. Upon determining that no more attributes remain, some embodiments may proceed to block 36 and designate an attribute having a lowest probability among the probabilities as an insightful node attribute for the cluster. For example, some embodiments may identify those attributes or attribute having less than a threshold determined probability of being observed or those attributes having less than a threshold rank according to this probability, such as the attribute having the lowest probability. In some embodiments, the respective attribute or attributes may be associated with cluster, and those attributes may be applied in subsequent processes, for instance in step 16 and 18 of FIG. 1.

Figure 3:
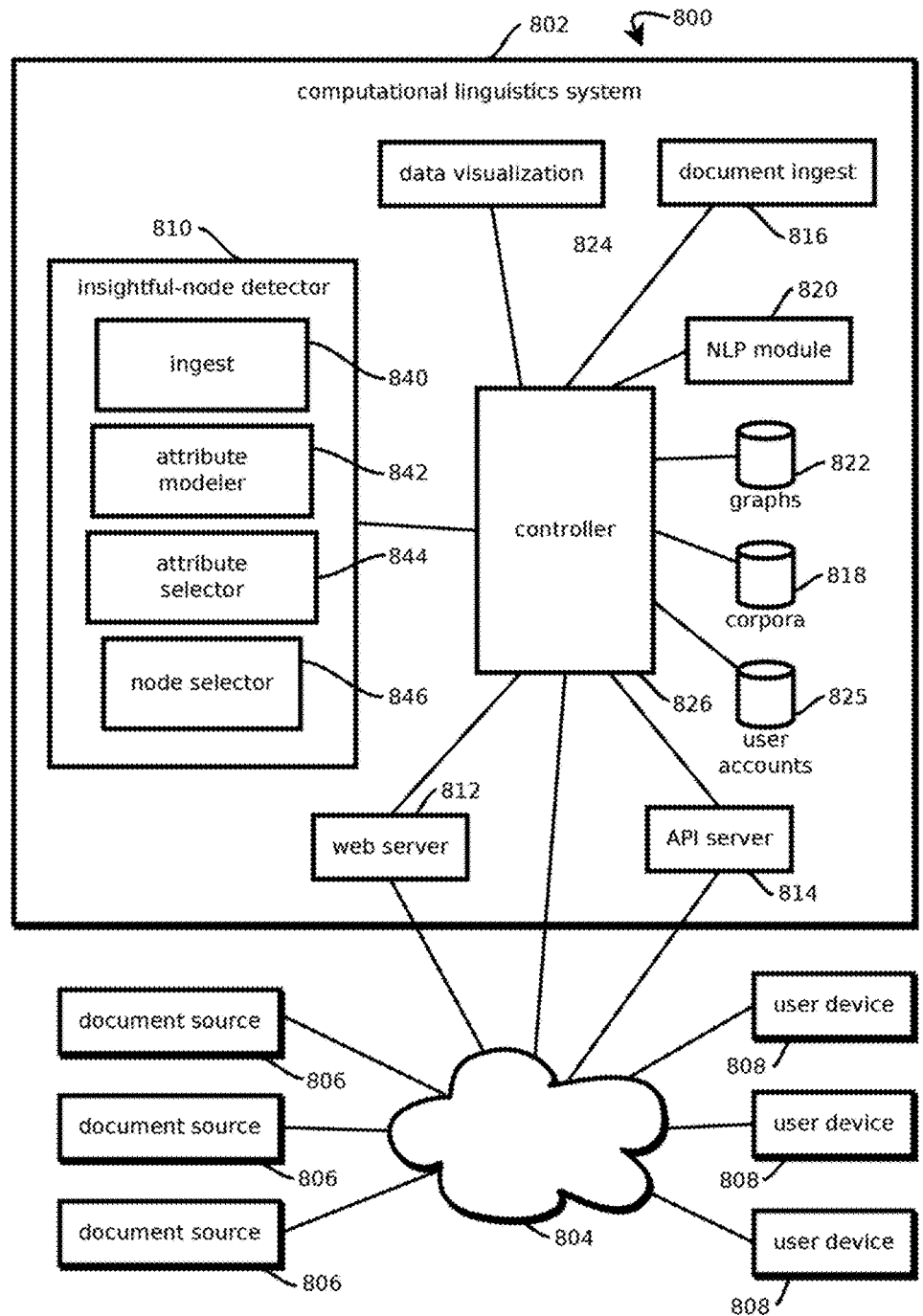
FIG. 3 illustrates an example of a computational linguistics system that may execute some embodiments of the processes of FIGS. 1 and 2, in accordance with some embodiments of the present techniques.

FIG. 3 illustrates, in block diagram form, the logical architecture of an example of a computing environment 800 in which the above-described techniques may be implemented. In some embodiments, many (and in some cases, most) queries and other analyses are expected to return information about relatively large collections of documents (e.g., more than 1,000, and in many cases, more than 10,000, or more than 100,000). This is the intended use case of some embodiments, which is distinct from many online search engines designed to designate the most relevant document. In view of this distinction, some embodiments of process the results and provide graphical user interfaces that facilitate insights on collections of responsive documents, rather than merely directing the user to individual documents. In many cases, users are more interested in what an entire field has to say about a particular topic, rather than finding, for instance, the most relevant individual document about some topic. Many traditional search engines are not well-suited for this type of analysis, as it is common for search engines to emphasize individual responsive documents rather than attempt to provide some synthesis of the collection of responsive documents. In contrast, some embodiments consistent with the present techniques may both help the user find the needle in the haystack, as well as develop an understanding of the haystack itself.

In some embodiments, environment 800 includes a computational linguistics system 802, the Internet 804, document sources 806, and a plurality of user devices 808, such as personal computers, laptops, or mobile devices having the features of the below-described computer systems. Representative devices are shown, but it should be understood that substantially more devices and instances may be used in commercial embodiments, e.g., more than 100, or more than 1,000 user devices, and more than 10, or more than 100 document sources.

In this example, subscribing users may submit commands (like specifying corpora and topics) to the system 802 (which may be geographically remote) via a web browser executing on user devices 808 and exchanges over the Internet 804. In some embodiments, users may submit commands to view (or otherwise interrogate, e.g., search) trends, entity relationships, sentiment relationships, term relationships, or document relationships (e.g., graphs of such relationships) determined by the computational linguistics system 802 based on unstructured plain text documents. These documents, in some cases, may be retrieved (e.g., downloaded) from content hosted by third party document sources 806, in some cases as batch downloads in advance of queries.

In some embodiments, the computational linguistics system 802 may include an insightful-node detector 810 to perform the above-described techniques, a web server 812, an application-program interface (API) server 814, a document-ingest module 816, a corpora repository 818, a natural-language processing module 820, a graph repository 822, a data visualization module 824, a user-account repository 825, and a controller 826. The controller 826 may coordinate the described operations of the other modules. In some cases, prior to granting access, the controller 826 may confirm a user's credentials against a user account in the repository 825 for security purposes and to verify whether a user account is current, e.g., a subscription fee has been paid.

FIG. 3 includes an insightful-node detector 810 that in some embodiments performs the processes of FIGS. 1 and 2. In some embodiments, the insightful-node detector 810 includes an ingest module 840, and attribute modeler 842, and attribute selector 844, and a node selector 846. In some embodiments, the ingest module performs the operations of block 12 of FIG. 1. In some embodiments, the attribute modeler 842 performs the operations of blocks 24 through 34 of process 22 of FIG. 2. In some embodiments, the attribute selector 844 performs the operations of block 36 of FIG. 2. In some embodiments, the node selector 846 performs the operations of blocks 16 and 18 of process 10 of FIG. 1.

In some embodiments, system 802 may include a web server 812 and an application-program interface (API) server 814. These servers may listen to corresponding network ports, maintain session state for various sessions with user devices 808, advance requests and posted data to controller 826, and send responsive data to user devices 808. In some cases, responses may be in the form of web pages, like serialized bodies of markup language, cascading style sheets, and JavaScript™ instructions used by web browsers to render content, like inputs for making requests or data visualizations of query responses. In some embodiments, the API server 814 may be operative to send structured responsive data, like XML or JSON formatted responses to queries and receive machine-generated requests. In some embodiments, the servers may be blocking servers, or the servers may use various techniques to process multiple requests concurrently, e.g., with various asynchronous programming techniques, like by tracking and implementing deferreds or promises.

In some embodiments, the document-ingest module 816 may obtain collections of documents and store those documents in corpora repository 818, which may have analyzed corpora of unstructured plain text documents used to generate the presently described graphs. In some embodiments, the documents may be obtained from different document sources 806, such as remote, third-party repositories of documents, like web servers.

In some embodiments, retrieved and stored corpora are collections of unstructured text documents. In some embodiments, the unstructured text may be included within structured portions of other documents, for example, rendered text within markup instructions in a webpage, or unstructured text embedded in a serialized data format, like paragraphs within an extensible markup language document or JavaScript™ object notation document. This surrounding structure notwithstanding, in some embodiments, at least some, and in some cases most or only, the text analyzed in constructing graph topologies is unstructured text, like human readable plain text in prose form with markup instructions and scripting language instructions removed. For instance, an automated web browser, like Selenium™, may be executed to retrieve web pages, execute scripts to and render markup language construct a document object model of the webpages, and parse visible text from the web pages that is retrievable from ".text" attribute of a DOM object containing the text. Removing the computer-readable portion is expected to cause documents to be grouped according to their content intended to be read by humans, rather than according to the programming library or practices invoked by a developer. Or some embodiments may leave this markup language and scripting instructions in place to analyzed documents according to their mode of construction or to weight terms according to their visual weight when rendered or annotate terms according to their context. In some embodiments, the text may be encoded as Unicode or ASCII text.

In some cases, an analyzed corpus may be relatively large, for example, more than 100 documents, more than 1,000 documents, or more than 10,000 documents, and connections indicating semantic similarity between the documents (or entities, sentiments, terms, or the like, as described below) may be relatively numerous, e.g., more than 5 connections on average between documents, like more than 50, more than 500, or between each unique pair of documents. In some embodiments, each of the documents may also include a substantial amount of text, for instance, more than 100 words, more than 500 words, or more than 2,000 words.

In some embodiments, an analyzed corpus used to construct a graph may be relatively large. For expected use cases of the present inventions, the corpus is larger than would be economically feasible for humans to manually perform the process 10 in reasonable amounts of time, and computers are required to implement the process 10 in commercially relevant intended applications. For example, the corpus may include more than 50 documents, like more than 500, or more than 5,000 documents. Further, in some embodiments, the documents within the corpus may be relatively long, for example, having a median length of more than 50 words, like more than 500 or more than 5,000 words, depending upon the use case.

The necessity of computer implementation, even for relatively small corpora, can arise from the number of documents, the length of documents, or the semantic pairwise interrelationships between the documents, which can give rise to data structures that can grow factorially with each additional document depending upon how aggressively semantic links between documents are pruned. Due to this scaling effect, each additional document in some applications can impose substantial additional computational and memory burdens, and increasing the number of documents even by a small amount can be a nontrivial problem, particularly without the benefit of some of the techniques described herein to expedite computer processing of the analysis and conserve limited memory within a computer system.

In some embodiments, the documents within the corpus may be related in some fashion, for example, all from the same source or related to a category of topics, entities, sentiments, or the like. Examples of corpora include academic literature, like scientific literature, medical literature, economic literature, psychological-research literature, and the like, for instance, from a given journal, university, country, or academic. Other examples include webpages, for example, from businesses, like the 500 highest ranking business entity websites responsive to a given query, businesses within a given region, business in a given industry, businesses at a given state of development (like emerging businesses), or combinations thereof, like startups in Silicon Valley targeting the shipping industry to give one example. Other examples of corpora include documents hosted in government databases, like the full text patent database hosted by the United States Patent Office, regulatory filings with the Securities and Exchange Commission hosted in the Edgar database, court filings within the Pacer database, Federal Communication Commission filings, United States Food and Drug Administration filings, and the like. Another example of corpora includes various bodies of journalism, like catalogs of newspapers, magazines, and the like. Relevant corpora also include social media posts, for example, microblog posts, blog posts, posts within social networks, and the like, as well as resumes, job postings, and product manuals. Some embodiments may operate on corpa of unrelated documents, such as any corpus containing metadata that could be represented as discrete data points or ranges.

In some cases, the corpus is obtained by processing non-text documents, for example, by performing optical character recognition on image-formatted documents or by submitting photographs to image recognition and description algorithms that return a prose description of photographs. In some cases, the corpus may be obtained without metadata indicating the semantic relationships between documents within the corpus, and these relationships may be discerned, for example, with software provided by Quid of San Francisco Calif., or by performing latent semantic analysis or other distributional semantic techniques to construct the graphs described herein. In some cases, the analysis may be performed by an unsupervised machine learning technique, or some embodiments may train supervised machine learning models (e.g., with stochastic gradient descent) based on a training set, like text data having manually-labeled features. Unsupervised methods are expected to be less expensive and more broadly applicable, as the cost and complexity of feature engineering may be reduced relative to supervised techniques, which is not to suggest that at least some embodiments are not also consistent with supervised learning.

In some embodiments, the natural-language processing module 820 may analyze these corpora and store resulting graphs in the graph repository 822, e.g., at query time or in advance, depending on acceptable latency and resources available, or in some cases partially in advance. In some cases, graphs like those described above may be obtained by subjecting a corpus to various types of distributional semantic analysis, e.g., statistical similarities measures like latent semantic analysis, random indexing, normalized Google™ distance, Best path Length On a Semantic Self-Organizing Map, Vector Generation of an Explicitly-defined Multidimensional Semantic Space, or other techniques by which the distribution of terms in documents is represented as relatively high-dimensional vectors, and semantic similarity is measured by according to similarity of the vectors, for instance, cosine similarity or Minkowski distance. The analysis technique used by some embodiments may be selected based on the type of relationships to be measured, e.g., between entities or terms, versus between larger units of language, like documents or paragraphs. In some cases, a corpus may be analyzed multiple ways, yielding graphs of relationships between entities mentioned in the documents as well as graphs of relationships between the documents.

Graphs need not be labeled as a "graph" in program code to constitute a graph. Other constructs may be used to the same ends and still constitute a graph. It is enough that the arrangement of information (e.g., in program state, storage, or both) contain the attributes of the presently described graphs to constitute a graph having edges and nodes. For example, in an object-oriented programming environment, documents may be mapped to "document" objects, and those objects may have an attribute of a list of semantically similar documents each of which corresponds to a different "document" object and has a similar list referencing other documents, regardless of whether this arrangement is referred to as a "graph" in code.

In some embodiments, to measure relationships between documents (or other larger language units, like paragraphs), each document may be represented by a feature vector in which each value of the vector indicates the presence, number of occurrences, or frequency of an n-gram in the document. N-grams are sequences of one or more terms, e.g., "the" is an example of an n-gram where n=1, "the quick" is another n-gram where n=2, and "the quick brown fox jumped" is another where n=5. In some cases, relatively uninformative terms, like stop words ("the," "a," and "an" being common examples), or terms detected with term-frequency inverse document frequency (TF-IDF) scoring may be omitted.

To calculate TF-IDF for a given n-gram, some embodiments may count the number of times the n-gram occurs within a given document and the number of other n-grams in the document before calculating a frequency with which the term occurs within the document. Some embodiments may also count the number of times the n-gram occurs in a larger collection of documents, such as the analyzed corpus of a sampling thereof, as well as the total number of terms in the larger collection of documents to calculate another frequency with which the term appears in the larger collection of documents. The two resulting frequencies may be compared, for instance, dividing one frequency by the other, to determine the TF-IDF score.

In some embodiments, a form of TF IDF may be calculated that suppresses the marginal effect of relatively high counts of n-grams within documents, for instance with a BM25 score. In some embodiments, the amount (e.g., count or frequency) of occurrences of the respective n-gram in a given document may occur both in a numerator and the denominator of a ratio with the amount of occurrences of the respective n-gram in the larger sample of other documents, for instance as a sum between these values in the denominator and the document-frequency in the numerator. In some embodiments, these values may have a derivative with respect to the amount of occurrences in the respective document that decreases in absolute value as the number of occurrences in the respective document increases, for instance monotonically or substantially monotonically. Thus, in some embodiments, the values may be proportionate or not proportionate to the amount of occurrences of the respective n-gram in the respective document. Suppressing the effect of higher occurrence amounts in the document at issue is expected to yield results closer to the user's intent, though embodiments are consistent with other (e.g., proportional) approaches.

Position of a value in the feature vector may correspond to one n-gram, e.g., the first position of a vector may correspond to the n-gram "jumped over," and documents containing this sequence of terms have a feature vector with value in the first position indicating that this term is present. Documents many be analyzed as a whole, or at higher resolution. For instance, in some embodiments, each document may be partitioned into paragraphs, and then, a feature vector may be constructed for each paragraph, with values of the vector corresponding to the presence of n-grams within the respective paragraph. Vectors need not be labeled as "vectors" in program code to constitute vectors, e.g., ordered lists may constitute a vector in some cases.

Because the universe of n-grams a document could contain is relatively large, and documents tend to use a relatively small portion of these n-grams, feature vectors tend to be relatively high-dimensional and sparse, having a value of zero for most values. To mitigate the burden of high-dimensionality, in some cases, feature vectors may be subjected by some embodiments to various types of dimensional reduction, like indexing, random indexing, or singular value decomposition.

In some cases, a corpus may be represented by arranging the feature vectors into a term-document matrix. For instance, each row or column may correspond to a document, and the values along the row or column may be the feature vector of that document. Thus, rows may represent documents, and columns n-gams, or vice versa.

Or in some embodiments, a document or corpus may be represented as a co-occurrence matrix, where both rows and columns represent n-grams, and values indicate the presence, number, or frequency of instances in which corresponding n-grams occur within a threshold distance of one another in the text. In some embodiments, co-occurrence matrices for documents may be appended to one another to represent a corpus in a higher-dimensional matrix, e.g., in a three dimensional corpus matrix, with each two-dimensional co-occurrence matrix corresponding to a document. Such matrices may be reduced in dimension with a number of techniques, including random indexing. Matrices need not be labeled as a "matrix" in program code to constitute a matrix, e.g., an ordered list of ordered lists may constitute a matrix.

In some cases, a variety of types of relationships may be processed with some embodiments. For instance, semantic similarity or relatedness of entitles mentioned in documents, sentiments expressed in documents, or terminology in documents may be determined with computational natural language processing of unstructured plain text corpora. In some embodiments, a corresponding graph may be constructed, with documents, paragraphs, entities, sentiments, or terms as nodes, and weighted edges indicating relationships, like similarity, relatedness, species-genus relationships, synonym relationships, possession relationships, relationships in which one node acts on another node, relationships in which one node is an attribute of another, and the like. In some cases, the edges may be weighted and directed, e.g., where the relationship applies in one direction and can vary in magnitude or certainty.

Analyses of such matrices may entail operations like insertion, multiplication, and addition. As noted above, in some embodiments, matrix operations may be prohibitively slow or memory intensive for a larger datasets. A number of techniques may be used to expedite these operations and reduce memory consumption. In some embodiments, to expedite operations, matrix operations may be performed in a single instance of a computer system, for example, within a single memory address space of a single operating system, and in some cases, by holding some or all of the matrix data in program state concurrently to avoid disk access or network access latency penalties. Or, some embodiments may distribute operations on additional computing systems, which is not to imply that any other feature described herein may not also be omitted. In some embodiments, the computer system may be configured with a relatively large amount of random access memory and on-chip cash memory to these ends.

In some cases, some of the sparse-matrices described above may consume a relatively large amount of memory using some traditional techniques. To conserve memory, some embodiments may compress the sparse matrices, for example, by decomposing a matrix into vectors, and translating the vectors into an index indicating which vector scalars have a nonzero value and corresponding indications of those values. Some embodiments may compress such vectors with run-length coding of values of those values that are zero. Some examples may compress sparse matrices as a dictionary of key, a list of lists, a coordinate list, a compressed sparse row, or a compressed sparse column. In some cases, such matrices, or portions of sparse matrices, may be expanded for some vector operations and then re-compressed after and before, respectively, the sparse matrices, or portions thereof, are moved upward in a memory hierarchy towards a processor.

Various encodings may be selected to improve the functioning of a computer system. In some cases, values of matrices, like weights, may be normalized, for example, ranging between zero and one or as eight, 16, or 32 bit binary values having a number of digits selected in view of an operating system, register size, memory bust size, and other hardware constraints of a computer system upon which the above processes are to be run to expedite operations and conserve memory.

Some embodiments may determine document similarity based on latent semantic analysis of unstructured text in the documents. For instance, some embodiments may create a term document matrix of the documents. Then, the term-document matrix may be transformed with singular value decomposition (SVD) to map documents to concepts expressed by the terms. Documents having similar concepts may be deemed similar, e.g., based on similarity of concept vectors for the documents yielded by SVD. In some cases, terms appearing with more than a threshold frequency in the documents may be determined and weighted according to TF-IDF. In some cases, the resulting weighted term document matrix may be decomposed by determining two vectors, that when multiplied, approximate the matrix. In some embodiments, error between the approximation and the matrix may be determined, and the error may be decomposed by determining two more vectors that when multiplied approximate the matrix of errors. This process may be repeated until an aggregate error is determined to be smaller than a threshold. A threshold number (e.g., the second and third) of the resulting vectors may correspond to dimensions in a concept space, where the concepts that emerge correspond to co-occurrence of terms in documents indicated by clusters in the space. Documents may be clustered according to their corresponding vectors in the concept space, or similarity of documents may be determined by some embodiments by comparing their respective vectors in this space, e.g., based on cosine similarity or other measures.

In some cases, high dimensional sparse vectors may be reduced in dimension with random indexing. For instance, document text may be represented in a co-occurrence matrix, where rows represent n-grams, columns represent adjacent n-grams (like within a threshold number of words in the text), or vice versa, and values represent presence, number, or frequency of instances in which corresponding terms are determined to be adjacent one another in the text. In some cases, to reduce memory consumption of sparse vectors in such a semantic similarity analysis, a co-occurrence matrix may be created by representing adjacent n-grams as vectors that are smaller (e.g., substantially smaller) than the number of potential adjacent n-grams and are made generally distinguishable from one another by randomly (e.g., pseudo-randomly) assigning values, like 0, +1, or −1. As adjacent n-grams are encountered during parsing, corresponding rows or columns of n-grams in the co-occurrence matrix may be updated by summing current values of the row or column with corresponding values of the adjacent n-gram vector. Similarity of n-grams (and corresponding entities) may be determined based on similarity of resulting vectors in the co-occurrence matrix, e.g., based on cosine similarity.

In some cases, similarity (or other relationships) between larger language units may be determined. For instance, in some cases, a feature vectors may be determined for documents in a corpus. Some embodiments may execute a density-based clustering algorithm, like DBSCAN, to establish groups corresponding to the resulting clusters and exclude outliers. To cluster according to vectors, some embodiments may iterate through each of the vectors reflected in the records and designate a vector as a core location in vector space if at least a threshold number of the other vectors in the records are within a threshold distance in vector space. Some embodiments may then iterate through each of the vectors and create a graph of reachable vectors, where nodes on the graph are identified in response to non-core corresponding vectors being within a threshold distance of a core vector in the graph, and in response to core vector in the graph being reachable by other core vectors in the graph, where to vectors are reachable from one another if there is a path from one vector to the other vector where every link and the path is a core vector and is it within a threshold distance of one another. The set of nodes in each resulting graph, in some embodiments, may be designated as a cluster, and points excluded from the graphs may be designated as outliers that do not correspond to clusters.

In some cases, when performing these operations, movements within a memory hierarchy of a computer system (e.g., from storage, to dynamic random access memory, to L3 cache, to L2 cache, to processor registers) may be relatively slow, and memory space may be particularly limited higher in the hierarchy, closer to the processor. For example, access to data stored in registers of a processor, such as a CPU or graphics processing unit, may be relatively fast, while the amount of available storage may be relatively low. Level 2 and level 3 cache, respectively, may offer trade-offs of increasing magnitude, exchanging slower access times for greater storage space. Similarly, dynamic random access memory may offer even greater storage, though access times may be several orders of magnitude slower than the registers or cache memory, and persistent system storage, such as a hard disk or solid-state drive) may extend this trade-off even further. In some embodiments, matrices may be large enough that during operation substantial portions of the matrix, for example, most of the matrix, cannot fit into the higher levels of a memory hierarchy, and portions of the matrix may be swapped in and out of the higher levels of memory hierarchy during operations on those portions. As a result, in some embodiments, movement of data between levels of the memory hierarchy may account for a substantial portion of the computing resources, e.g., time and memory, consumed by a matrix operation. As some use cases reach relatively large scales, this consumption of computing resources may become prohibitive.

In some embodiments a blocking algorithm may be executed during certain matrix operations, for example, when multiplying two dense matrices or a dense matrix by a sparse matrix, to improve the functioning of the computer system and reduce the amount of time spent shifting data back and forth between levels of a memory hierarchy. In some embodiments, upon initiating a matrix multiplication, one or both of the matrices may be subdivided into blocks (e.g., tiles), each having a plurality of contiguous values within the respective matrix within a plurality of a sequence of rows and columns, for instance, those values that are both in the first 8 columns and in the first 8 rows might constitute one tile. In some embodiments, tile size may be selected based on the amount of available memory at various levels of a memory hierarchy, such that a given tile can fit within a targeted level of the hierarchy, like the level 2 or level 3 cache. Next, some embodiments may iterate through the tiles, loading the tiles into a higher level of the memory hierarchy, and then performing operations with that tile. In some embodiments, a given tile, after being loaded into the higher level the memory hierarchy, may be applied to update each implicated value of a product matrix. In some cases, the values of the product matrix may be initially set to zero, and then those values may accumulate updates as tiles are loaded and processed, until all of the tiles have been processed, and the final value of the resultant matrix is known. In some cases, updating a given value may include summing an existing value with one or more products of values within a tile that has been loaded into the higher level of the memory hierarchy. References to higher and lower levels of memory hierarchy, rather than specific levels, are intended to indicate the applicability of this approach to different levels of the hierarchy, for example, the higher and lower levels may be level 2 cache and dynamic random access memory respectively or level 2 cache and level 3 cache respectively. In some cases, multiple levels of tiling may be performed, e.g., a tile loaded into cache may be sub-divided into register-sized sub-tiles. In some cases, some of the techniques for accelerating matrix or vector operations or conserving memory may be implemented by invoking appropriate sequences of commands in a basic linear algebra subroutine library, like level 1, 2, or 3 commands.

Some embodiments may learn a set of topics and n-grams pertaining to the respective topics, and label documents, collections of documents, and n-grams according to scores indicating a pertinence of the topic. In some embodiments, the number of topics may be relatively large, for example, more than 10 topics, and in many cases substantially more, like more than 50, more than 500, or more than 1,000 topics in relatively fine-grained analyses. In some embodiments, the topics may be arranged in a hierarchical taxonomy, for instance, with "health" at a top level, "heart health" and "lung health" at an intermediate level, and "heart attacks" and "hypertension" at a lower level of the former. In some embodiments, the topics may be labeled topics in the sense that each topic has a term that refers to the concept or set of concepts to which the topic pertains, like the topic name "health." In other embodiments, the topics are unlabeled, for instance, corresponding to a collection of concepts or a concept that are inferred to be distinct from other collections of concepts, but these concepts or collections of concepts may be unnamed (e.g., after topics are identified but before topics are labeled) beyond merely being recognized as distinct by some embodiments. For example, some unsupervised learning techniques may group or score keywords according to a specified number of topics, without labeling each of those topics.

In some embodiments, each topic may be associated with a set of n-grams, such as one, two, three, four or more consecutive words appearing in natural language text. For example, the phrase "quick brown fox jumped over the lazy dog" includes bi-grams of "quick brown," "brown fox," "fox jumped," and so on, as well as tri-grams like "quick brown fox," "brown fox jumped," and so on. Some embodiments may include n-grams up to some threshold, like 1 (for keywords), 2, 3, 4, or 5. In some embodiments, the n-grams may be obtained from the text of a set of documents for extracting topics. In some embodiments, the set of documents may be the corpus obtained, a subset of the corpus (e.g., a random sample deemed large enough to yield statistically significant results while expediting processing), an overlap with the corpus, or a different set of documents. In some embodiments, the n-grams may be each unique n-gram present in the set of documents, in some cases excluding stop words.

In some embodiments, each topic may have a topic-specific score associated with each of these n-grams, for instance, in the form of a topic vector, where dimensions of the vector corresponds to each of the topics, and where values of each of the dimensions indicate an amount by which the corresponding n-gram is predictive of the corresponding topic. For example, a topic vector for the topic of "basketball" may include a dimension corresponding to the n-gram of "backboard" and that n-gram's dimension in the vector may have a score of 0.95 indicating a relatively strong predictive value for inferring that the n-gram refers to the topic of "basketball." The same topic vector may include another dimension corresponding to the n-gram of "court," and the n-gram may have a score of 0.3, illustrating a much weaker predictive value, for instance, due to this n-gram being used in association with many other topics, like a court of law. Similarly, the same set of topics may include the topic of "law," and the n-gram of "court" may have a score for this topic that is higher, for instance 0.6, indicating that the conditional probability of "law" being exhibited when the n-gram of "court" is observed is higher than the conditional probability of "basketball" being exhibited when the same n-gram is observed.

Encoding the topic-specific scores of the n-grams in the form of a topic vector is expected to consume less memory than systems that explicitly record key-value pairs for each topic and each n-gram and reduce the amount of data shifted up and down a memory hierarchy in a computer system or between computer systems, thereby yielding faster computations, though embodiments are also consistent with these slower approaches. Some embodiments may encode the topic vectors as tuples. In some cases these scores, and the other scores described herein, may be encoded as binary values of some length selected based on a specification of an operating system or a central processing unit (CPU), such as an 8-bit value, a 32-bit value, or a 64-bit value, each corresponding to, for instance, an address space size of an operating system, a number of registers in a CPU, or a unit of memory that moves as a block between one level of memory hierarchy and another.

In some embodiments, to conserve memory, the set of n-grams associated with each topic may be pruned. For example, in some cases, n-grams having a topic-specific score that does not satisfy a threshold, for instance, is less than a threshold value (e.g., 0.7), may be omitted from the set of n-grams corresponding to the respective topic. In some cases, the correspondence of n-grams after pruning to topics may be indicated with a binary value of zero or one in a topic vector, with dimensions that satisfy the threshold being designated with a 1 and dimensions that do not being designated by a 0. In some cases these topic vectors are expected to be relatively sparse, and some of the techniques described below for expediting computing operations with sparse vectors may be employed to expedite computations.

In some cases, the topics, the set of n-grams, and the scores for those n-grams may be explicitly provided as an input, for instance, by a user configuring the system with hand-coded topic data. However, in many cases, users are seeking document relationship graphs because the users are seeking an understanding of a relatively large corpus and the topics therein. In many of these use cases, the user will not have on hand a defined topic set, nor will it be feasible for a user to accurately specify a topic set well calibrated for interrogating the corpus of documents.

In some embodiments, the set of topics, the set of n-grams corresponding to those topics, and topic specific scores for each of those n-grams may be inferred from a set of documents, like the corpus itself, a set with overlap with the corpus, or a different set of documents. In some cases, supervised learning may yield such a data set. For example, in some embodiments, a user may supply a training set of documents in which the documents have been labeled with the topics exhibited by the respective documents. In some embodiments, the labeling is relatively granular, with multiple topics appearing in the documents, and subsets of the documents labeled as pertaining to particular topics. For example, such labels may indicate a range of words in the document by word count, for instance, with a start word count and an end word count, and this range may be associated with an identifier of a topic and a score indicating a pertinence of the topic to the range of text (e.g., from 0 to 1). In other cases, the labeling may be less granular, and a single topic label may be applied to an entire document, or a collection of topic labels may be applied to an entire document, in some cases with a binary indication, or in other cases with a cardinal score indicating a pertinence of the respective topics to the respective document.

Based on this training set, for each topic, some embodiments may learn topic-specific scores for each n-gram, the scores indicating an amount that the corresponding n-gram predicts the corresponding topic. A variety of different techniques may be used to learn these topic-specific scores. In some embodiments, the result of learning may be a topic model (e.g., a mapping of topics to a set of n-grams, each n-gram having a topic-specific score indicating a conditional probability of the respective topic being exhibited upon observing the respective n-gram in a document) having parameters that indicate the topic-specific scores. In some embodiments, the topic model may be formed by arbitrarily assigning topic-specific scores to the n-grams, for instance by randomly, like pseudo-randomly, assigning such scores. Next, some embodiments may iteratively determine whether the model parameters agree with the labels in the training set and adjust the model parameters to increase an amount of agreement (or determine whether the model parameters disagree and adjust the model parameters to reduce an amount of disagreement). In some cases, these iterations may continue until an amount of change between iterations is less than a threshold or a threshold number of iterations have occurred. For instance, some embodiments may adjust the model parameters according to a stochastic gradient descent. In some embodiments, the topic-specific scores are determined with supervise learning, based on the training set, with a support vector machine. In some embodiments, the topic-specific scores are determined with supervise learning, based on the training set, with a Bayesian topic model.

In some embodiments, the topic-specific scores may be determined with unsupervised learning. In some cases, it can be relatively expensive and time-consuming to obtain the training set, or the available training sets may not be known to have the appropriate type of subject matter to yield topics relevant to the corpus at issue. In such scenarios, unsupervised learning may yield the set of topics, n-grams pertaining to the topics, and corresponding topic-specific scores without requiring a training set be provided.

Some embodiments may ascertain topics in documents, sets of n-grams (e.g., keywords, or bi-grams or tri-grams) pertaining to each topic, a score for each n-gram for each topic indicating how predictive the respective n-gram is of the topic, and an score for each topic for each document indicating an amount the topic is exhibited by the document. Some embodiments may perform this analysis with an unsupervised learning technique, e.g., without incurring the cost of obtaining a manually labeled training set of documents where humans tag text as pertaining to topics or supply topic-n-gram correspondence values.

For instance, some embodiments may execute a form of Latent Dirichlet Allocation. In some cases, a number of topics to be ascertained may be supplied, e.g., by a user indicating that 2, 3, 5, or 50 topics are to be ascertained. Next, some embodiments may arbitrarily (e.g., randomly, like pseudo-randomly) designate each n-gram in each document as pertaining to one of the topics. Then, some embodiments may iteratively adjust the designations to make n-grams that, within the set of documents, tend to co-occur in a document more likely to be designated with the same topic.

For example, some embodiments may, for each document, for each n-gram in the respective document, for each topic, determine 1) an amount (e.g., proportion relative to a total number of n-grams of the same length) of n-grams in the respective document designated as pertaining to the respective topic, and 2) an amount (e.g., proportion relative to all documents) of all instances of n-grams (e.g., of the same length as the respective n-gram) in all of the documents designating as pertaining to the respective topic. And then for the respective document and n-gram, some embodiments re-designate the respective n-gram as pertaining to a topic selected according to a probability of the topics.

The probability of the topics may be 1) the conditional probability of the respective topic being exhibited given the respective document multiplied by 2) the conditional probability of the respective n-gram occurring given that the respective topic is exhibited (as indicated by the current distribution of assignments). In some embodiments, this operation may be repeated until the designations converge, e.g., until less than a threshold amount of designations change, or a sum or measure of central tendency of the second conditional probability changes by less than a threshold amount, or until a threshold number of iterations have occurred.

In some embodiments, for larger document sets, or larger documents, the operations may be relatively computationally complex and resource intensive. Accordingly, some embodiments may perform the analysis in a distributed computing framework, like Apache Hadoop or Spark, e.g., with documents or portions of documents being assigned to different nodes (e.g., computing devices or threads), and each node determining document-specific values (e.g., counts of n-grams or topic-pertinence, etc.), before the document-specific values are aggregated, e.g., to determine conditional probabilities for a population of documents. In some cases, some tasks may be assigned to nodes by document (e.g., sending each node a subset of documents), while other tasks may be assigned to nodes by topic (e.g., sending each node a subset of topics). In some cases, the number of nodes may be relatively large, e.g., exceeding 10, or 100 nodes. Sending instructions to the distributed data, rather than moving data between computing devices where instructions are static, is expected to yield faster results for particularly large data sets. Or some embodiments may perform these operations in a single thread or a single computing device.

Some embodiments may account for changes in topic associations with n-grams over time. In some cases, a plurality of sets of n-grams pertaining to a given topic may be determined, with each instance in the plurality being determined based on a different set of documents, each set of documents being associated with a duration of time, such as continuous ranges of time, like by year. In some cases, a user may select a particular time range for a particular topic or set of topics, and the corresponding time-range specific topic vectors may be selected for subsequent processing.

Some embodiments may learn multiple sets of topics, with each instance corresponding to a different granularity of topics. For instance, some embodiments may execute one of the above-described unsupervised techniques for learning a topic model with a first number of topics, like five, to yield a first set of topics and n-grams pertaining to the respective topics, and then execute the same technique with a different number of topics, like 50, to yield a second set of topics and n-grams pertaining to those respective topics, with greater granularity. Some embodiments may provide a user interface by which a user may select a granularity before selecting a topic, and corresponding topic vectors may be determined in response to the user selection.

In some embodiments, whether the topics and associated values are obtained with supervise learning, unsupervised learning, or explicitly provided, each topic may be specified by a topic vector, and the collection of topic vectors may form a topic matrix, with one dimension corresponding to topics (e.g., columns of the matrix), another dimension corresponding to n-grams (e.g., rows of the matrix, or vice versa). In some embodiments, the topic-specific scores may be normalized across topics. For instance, some n-grams may be relatively common generally and have a high correspondence with each of the topics, in which case, some embodiments may reduce an amount by which the corresponding n-grams are indicated to predict the topics relative to n-grams that have relatively isolated correspondence to relatively few topics. In some cases, such normalization may emerge in the process of learning topic-specific scores, or some embodiments may impose such normalization, for instance, by dividing each topic-specific score for each n-gram with the sum of topic-specific scores for the respective n-gram across all of the topics. In some cases, visualizations may reflect topics associated with corresponding elements.

In some embodiments, the data visualization module 824 may be operative to prepare data visualizations for display on user devices, e.g., visualizations of the graphs described herein. In some cases, such visualizations may include physics-based arrangements of nodes within a display, like a force-directed layout. In some cases, graph generation and visualization preparation takes place on system 802, and resulting interactive visualizations run (e.g., entirely) in a web browser of a user device. In some cases, this entails displaying and manipulating thousands of vertices and edges in an environment on user devices not known for speed. At the same time, in some use cases, users desire a relatively large amount of data on display, while keeping a responsive frame rate. To increase frame rate, some embodiments may use various techniques to optimize the network visualization and make the computer system run faster, including invoking WebGL commands to enlist a user's GPU in rendering a web page and pre-processing.

Graphs of real-world information are often relatively intricate. In some embodiments, visualizations may support real-time (e.g., in this context, with less than 500 ms latency) interactions with relatively large numbers of interactive objects, e.g., more than 500, like more than 1,000, and in some cases as many as 20,000 interactive objects with near zero latency. In some embodiments, this speed is accomplished by pre-processing physics models of graph layouts with a graphical processing units (GPUs) of the system 802, to reduce the computational burden on less powerful CPUs executing browsers on user devices. In some cases, displays may be relatively high dimensional, e.g., various visual attributes, like line weight, icon size, color, transparency, drop shadow offsets, or properties of physical models, like inertia, friction, attractive forces, repulsive forces, momentum, frequency of oscillation, and the like, may be mapped to different dimensions like those discussed above, e.g., similarity, relatedness, sentiment, and the like. Connections tend to be more relatively complicated and irregular, and embodiments often do not determine the visual shape of the graph ahead of time. Indeed, graph isomorphism provides for a relatively large number of visual arrangements of otherwise identical graphs, but many arrangements are relatively un-informative and difficult to visually parse to a human user consuming the resultant data.

To visualize graph relations, some embodiments of module 824 may arrange vertices (also referred to as nodes) and edges using a physics simulation that mimics the stretching of spider webs. Some spider-web-inspired representations may model interactions between each pair of vertices as a Coulomb-like repulsion and an additional Hooke-like attraction in the presence of an edge between the pair. A relatively weak gravitation-like force may be modeled to prevent separate components and isolated vertices from venturing too far from the network's center of mass. Thus, some embodiments may use this physics-based network layout. In some cases, the parameters and initial conditions of the physics based model may be determined by module 824, and instructions for executing the model and adjusting the model based on user input may be sent to the user device, e.g., in the form of JavaScript™ instructions that model, for instance, a user selecting and dragging a node as a force applied to the physics model. Embodiments are expected to appear relatively natural, and the hierarchy of a network's structure is expected to be readily apparent; both small and large network structures are exposed, which is expect to allow users to study relationships between groups of vertices on different scales.

Running a physics simulation in a user's browser can easily exceed the available computing resources, as the simulation can be inherently resource-intensive for larger, highly connected data sets. To mitigate this issue, some embodiments may exploit phenomena expected to arise as the size of the data scales. It is expected that, in some embodiments, the number of time steps consumed to achieve equilibrium starting with a random configuration of vertices scales linearly with the number of vertices. That is undesirable for presentation purposes (though some embodiments are consistent with this approach, particularly for smaller data sets). To mitigate this, some embodiments may arrange for initial conditions of the simulation so the equilibrium is attained faster.

To select initial conditions of the physics-based animation of this n-body system, some embodiments may perform a gradient descent optimization. Some embodiments may compute the gradient of the modeled system's energy (e.g., based on the forces affecting nodes), integrate that to compute momentum, and move the particles in the simulation representing nodes accordingly. Initial conditions of the gradient descent may be selected strategically in some cases to mitigate the effects of local minima in what is expected to be a relatively rough energy landscape (though embodiments are also consistent with random selection of initial conditions, like with a stochastic gradient descent). For instance, some embodiments may seed the simulation with a vertex configuration that is in the vicinity of the final destination. To this end, some embodiments may execute a discretized version of the problem and search through all vertex configurations on a 2D grid.

This process is still of combinatorial complexity, however, and may be generally too expensive for some larger graphs. To mitigate this issue further some embodiments may simplify the search space to one dimension with space filling curves, like a z-curve or Hilbert curve that cover a 2D region of space with a one-dimensional curve. Such space-filling curves may be constructed via an iterative process, whereby at each step of the iteration the curve is refined at ever-finer scales. By ceasing iterations at a finite step, some embodiments may obtain a curve with just enough points to accommodate the data at issue. Further benefits, in some embodiments may arise from the property of some space filling curves: the 2D distance between any pair of vertices is well-approximated by (the square root of) the distance along the curve. In this scenario, in some embodiments, the problem of finding an approximate 2D layout is equivalent to finding an energy-optimal linear ordering of vertices, which some embodiments may use to implement less computationally intensive heuristics, circumventing the initial combinatorial complexity. That said, not all embodiments provide this benefit, as the various inventions described herein are independently useful.

Figure 4:
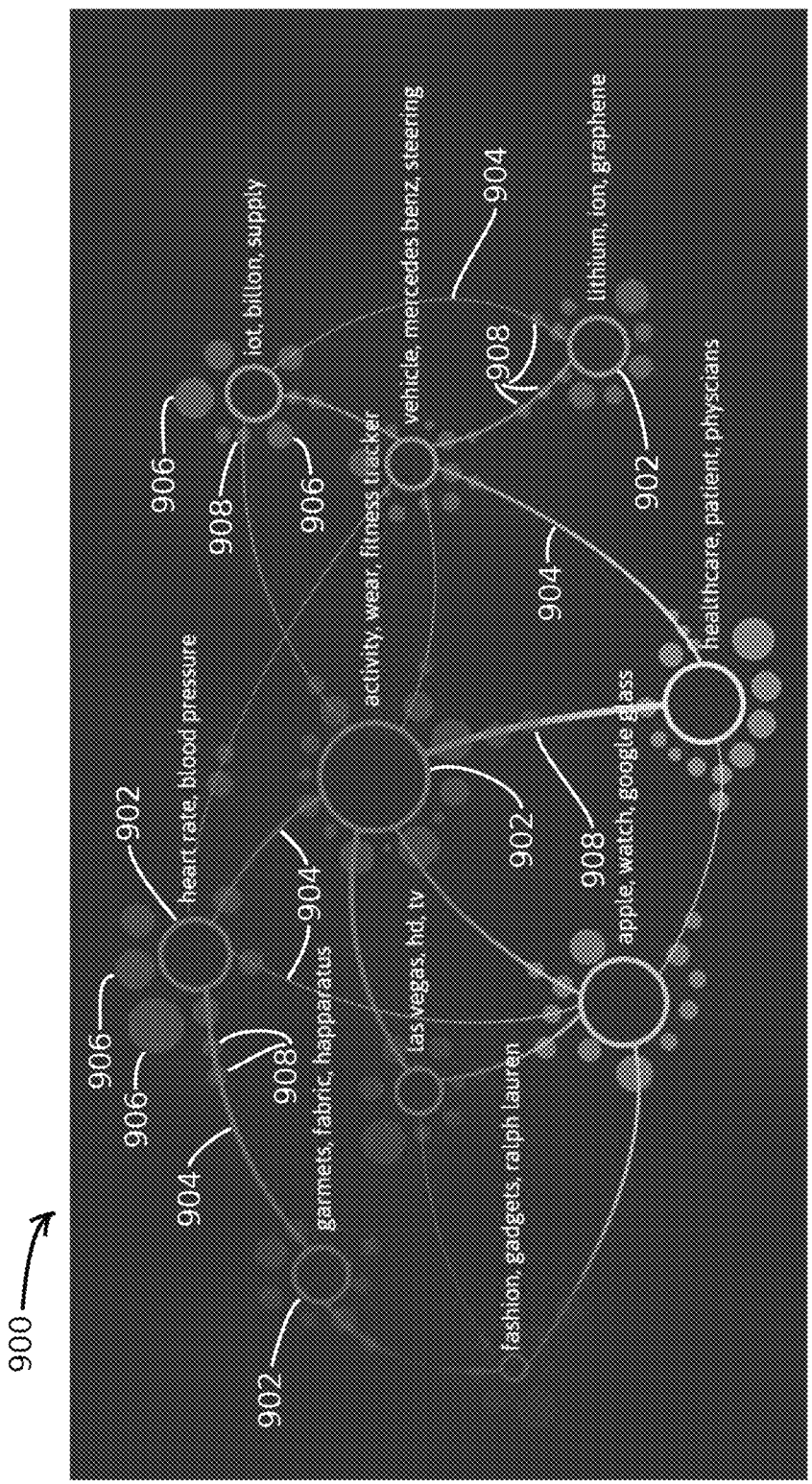
FIG. 4 illustrates an example of a graphical representation of a graph produced by the processes and systems of FIGS. 1-3, in accordance with some embodiments of the present techniques.

FIG. 4 illustrates an example of a graphical representation of a clustered graph 900. In some cases, the graphical representation may be displayed in a web browser of a client computing device, such as one operator remotely from the computational linguistics system 802 of the above figure. In some embodiments, the graphical representation may be a two-dimensional graphical representation, or in some embodiments the representation may be higher dimensional, such as a three-dimensional graphical representation presented in a virtual reality or augmented reality display having stereoscopic view and head tracking.

In some embodiments, the graphical representation 900 includes a plurality of icons 902 representing clusters of nodes. In some cases, the clusters may be connected by lines 904, such as lines indicating aggregate statistics about edges extending between nodes in the respective clusters. In some embodiments, the graphical representation may include node icons 906 and 908 adjacent the cluster icons 902 in which the respective nodes are found, with node icons 906 and 908 corresponding to the first subset and second subset of insightful nodes identified in step 16 and 18 of FIG. 1. In some embodiments, insightful nodes pertaining to edge properties may be positioned on the lines extending between clusters, as indicated by cluster node icons 908, and node icons corresponding to insightful nodes as a result of attributes that are not related to edge properties may be disposed around the respective cluster icons 902 in the form of node icons 906, such as adjacent one another. In some embodiments, the size of the cluster icons 902 may indicate various attributes of the clusters, such as a number of nodes in the respective clusters or a density of the respective clusters. In some embodiments, the size of the insightful node icons 906 and 908 may indicate a magnitude of an attribute deemed insightful. In some embodiments, the insightful node icons may be positioned according to a force directed graph around the respective cluster icons 902. As illustrated, in some cases, text pertaining to the respective clusters, such as keywords or n-grams having greater than a threshold topic score may be displayed adjacent the respective clusters.

In some embodiments, the graphical representation may be responsive to user inputs, such as zooming, panning, and icon selection. For instance, some embodiments may include event handlers for the respective icons, and upon a user clicking on, hovering over, touching, or otherwise selecting respective icons, some embodiments may present responsive information, such as the text of a document pertaining to the icon, various attributes of the node pertaining to the icon, aggregate attributes of the clusters, and the like.

Thus, some embodiments may facilitate relatively quick and detailed exploration of a relatively large data set in the form of a graph, as both representative and outlier nodes may be brought to the user's attention while still providing an overarching summary of the structure of the graph.

Figure 5:
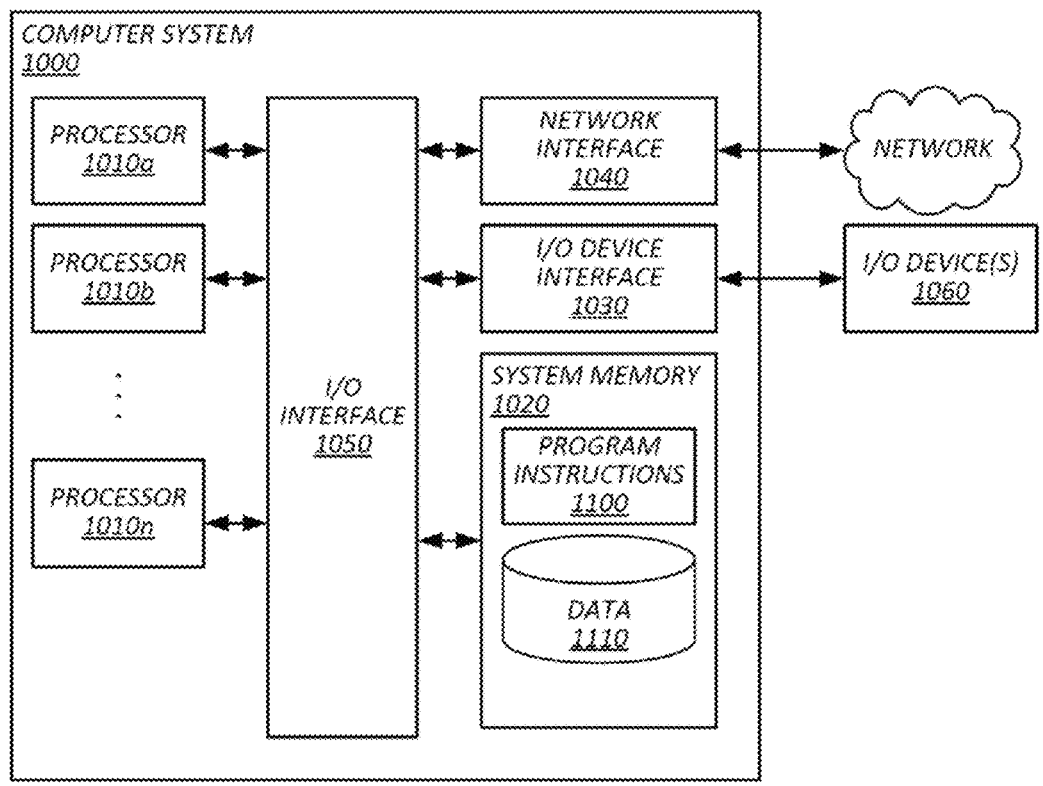
FIG. 5 illustrates an example of a computer system by which the above techniques may be implemented.

FIG. 5 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times, e.g., a copy may be created by writing program code to a first-in-first-out buffer in a network interface, where some of the instructions are pushed out of the buffer before other portions of the instructions are written to the buffer, with all of the instructions residing in memory on the buffer, just not all at the same time.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to costs constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs.

The present techniques will be better understood with reference to the following enumerated embodiments:

1. A method, comprising: obtaining, with one or more processors, a clustered graph having more than 1,000 nodes and more than 2,000 edges, wherein: each respective edge connects a respective pair of the nodes, and each of the nodes has a plurality of respective node attributes other than an identifier of the node; obtaining, with one or more processors, a designation of a given node attribute from among the plurality of node attributes; identifying, with one or more processors, a first subset of nodes of the graph as having anomalous values of the given node attribute by comparing values of the given node attribute in the first subset to a distribution of the given node attribute; identifying, with one or more processors, a second subset of nodes of the graph as having representative values of the given node attribute by comparing values of the given node attribute in the second subset to the distribution of the given node attribute; and sending, with one or more processors, instructions to a client device to display a representation of the graph, the representation of the graph comprising: a plurality of clusters of the nodes; visual identification of at least some nodes of the first subset as being members of the first subset; and visual identification of at least some nodes of the second subset as being members of the second subset.

2. The method of embodiment 1, wherein: the graph comprises more than 5,000 nodes and more than 10 clusters; the node attributes comprise: more than 4 non-edge attributes; and more than 2 edge attributes; obtaining a designation of a given node attribute from among the plurality of node attributes comprises: determining mean values of each of the node attributes for each of the clusters; determining sizes of each of the clusters; determining distributions of mean values of each of the attributes for random samplings of the size of the clusters from among nodes of the graph, including nodes outside the respective cluster; based on the distributions, selecting attributes that have mean values that have probabilities in the distributions of less than a threshold amount, wherein different attributes are selected for different clusters; sending instructions comprises sending instructions to display a force directed layout of clusters of the graph with cluster icons representing the respective clusters and node icons adjacent the cluster icons corresponding to members of the first subset and the second subset; obtaining a clustered graph comprises obtaining a semantic similarity graph of documents based on semantic similarly of unstructured text in the documents by performing operations comprising: determining a feature vector for each document, each feature vector having plurality of scores, each score corresponding to a given n-gram and being based on: an amount of occurrences of the given n-gram in the respective document, a length of the respective document, an amount of occurrences of the given n-gram in a plurality of other documents different from the respective document, and whether the given n-gram is among the set of n-grams pertaining to the selected topic; and determining an adjacency matrix based on the feature vectors, wherein rows and columns of the adjacency matrix correspond to the documents, values of the feature matrix correspond to a selected-topic-adjusted semantic similarity of documents corresponding to the respective row and column of the values, and values of the feature matrix are based on angles between feature vectors of the documents corresponding to the respective row and column of the values, the operations comprising steps for reducing movement of data across a memory hierarchy.

3. The method of any of embodiments 1-2, wherein at least some of the node attributes are cardinal values indicating a quantity pertaining to an entity represented by the respective node.

4. The method of embodiment 3, wherein the nodes represent documents and wherein the attributes comprise: an amount of times the respective document was shared between users.

5. The method of embodiment 3, wherein the nodes represent businesses and wherein the attributes comprise: a metric of the respective business's performance.

6. The method of any of embodiments 1-5, wherein at least some of the node attributes are values indicating properties of edges connected to the respective node.

7. The method of embodiment 6, wherein the properties of edges include an amount of edges having greater than a threshold edge weight.

8. The method of embodiment 6, wherein the properties of edges include an amount of edges extending between clusters of the nodes.

9. The method of any of embodiments 1-8, wherein obtaining a designation of a given node attribute from among the plurality of node attributes comprises: selecting a cluster from a plurality of clusters of nodes of the graph; determining measures of central tendency for each of a plurality of attributes of the nodes of the selected cluster; determining, based at least in part on nodes outside the selected cluster, probabilities of each of the measures of central tendency arising from a sampling of nodes of the graph; and designating an attribute having a lowest probability among the probabilities as the given node attribute.

10. The method of embodiment 9, comprising: determining a number of nodes in the cluster, wherein: the measure of central tendency is a mean; sampling comprises forming more than 20 sample groups, each sample group having the number of nodes randomly sampled from the graph; determining probabilities of each of the measures of central tendency comprises:
determining respective mean values for respective attributes of each of the respective sample groups; and comparing a mean value of the respective attribute of the cluster to a distribution of means of the respective attribute among the sample groups based on a mean of the mean values of the sample groups and a variance of the mean values of the sample groups.

11. The method of any of embodiments 1-10, wherein obtaining a designation of a given node attribute comprises steps for obtaining a designation of a given node attribute as an insightful node attribute.

12. The method of any of embodiments 1-11, wherein obtaining a designation of a given node attribute comprises steps for obtaining a designation of a given node attribute as an insightful node attribute based on measures of central tendency of node attributes in clusters.

13. The method of any of embodiments 1-12, wherein first subset is a node having a given attribute value closer to a mean value of the given attribute within a given subset of the nodes than a majority of other nodes of the given subset of nodes.

14. The method of embodiment 13, wherein the given subset corresponds to a cluster of nodes of the graph.

15. The method of any of embodiments 1-14, wherein the second subset of nodes is nodes having outlier values of the given node attribute relative to the respective clusters having nodes in the second subset.

16. The method of any of embodiments 1-15, wherein sending instructions to a client device to display a representation of the graph comprises: sending instructions to display a force directed layout of the clusters, each cluster being represented by a respective cluster icon; sending instructions to display a plurality of attribute icons representing the first subset and the second subset adjacent respective cluster icons of clusters including respective members of the first sub set.

17. The method of embodiment 16, wherein: the cluster icons are connected by lines; and attribute icons corresponding to edge property attributes are arranged with respect to the lines.

18. The method of embodiment 16, wherein visual attributes of the attribute icons vary according to: whether the respective attribute icon represents a representative node for the respective attribute; and whether the respective attribute icon represents an outlier node for the respective attribute.

19. The method of any of embodiments 1-18, wherein sending instructions to a client device to display a representation of the graph comprises steps for preparing a visual representation of the graph.

20. A tangible, non-transitory, machine-readable medium storing instructions that when executed by a data processing apparatus cause the data processing apparatus to perform operations comprising: the operations of any of embodiments 1-19.

21. A system, comprising:
one or more processors; and
memory storing instructions that when executed by the processors cause the processors to effectuate operations comprising: the operations of any of embodiments 1-19.

What is claimed is:

1. A method, comprising:
obtaining, with one or more processors, a clustered graph having more than 1,000 nodes and more than 2,000 edges, wherein:
each respective edge connects a respective pair of the nodes, and
each of the nodes has a plurality of respective node attributes other than an identifier of the node;
obtaining, with one or more processors, a designation of a given node attribute from among the plurality of node attributes;
identifying, with one or more processors, a first subset of nodes of the graph as having anomalous values of the given node attribute by comparing values of the given node attribute in the first subset to a distribution of the given node attribute;
identifying, with one or more processors, a second subset of nodes of the graph as having representative values of the given node attribute by comparing values of the given node attribute in the second subset to the distribution of the given node attribute; and
sending, with one or more processors, instructions to a client device to display a representation of the graph, the representation of the graph comprising:
a plurality of clusters of the nodes;
visual identification of at least some nodes of the first subset as being members of the first subset; and
visual identification of at least some nodes of the second subset as being members of the second subset.

2. The method of claim 1, wherein:
the graph comprises more than 5,000 nodes and more than 10 clusters;
the node attributes comprise:
more than 4 non-edge attributes; and
more than 2 edge attributes;
obtaining a designation of a given node attribute from among the plurality of node attributes comprises:
determining mean values of each of the node attributes for each of the clusters;
determining sizes of each of the clusters;
determining distributions of mean values of each of the attributes for random samplings of the size of the clusters from among nodes of the graph, including nodes outside the respective cluster;
based on the distributions, selecting attributes that have mean values that have probabilities in the distributions of less than a threshold amount, wherein different attributes are selected for different clusters;
sending instructions comprises sending instructions to display a force directed layout of clusters of the graph with cluster icons representing the respective clusters and node icons adjacent the cluster icons corresponding to members of the first subset and the second subset;
obtaining a clustered graph comprises obtaining a semantic similarity graph of documents based on semantic similarly of unstructured text in the documents by performing operations comprising:
  determining a feature vector for each document, each feature vector having plurality of scores, each score corresponding to a given n-gram and being based on:
    an amount of occurrences of the given n-gram in the respective document,
    a length of the respective document,
    an amount of occurrences of the given n-gram in a plurality of other documents different from the respective document, and
    whether the given n-gram is among the set of n-grams pertaining to the selected topic; and
  determining an adjacency matrix based on the feature vectors, wherein rows and columns of the adjacency matrix correspond to the documents, values of the feature matrix correspond to a selected-topic-adjusted semantic similarity of documents corresponding to the respective row and column of the values, and values of the feature matrix are based on angles between feature vectors of the documents corresponding to the respective row and column of the values, the operations comprising steps for reducing movement of data across a memory hierarchy.

3. The method of claim 1, wherein at least some of the node attributes are cardinal values indicating a quantity pertaining to an entity represented by the respective node.

4. The method of claim 3, wherein the nodes represent documents and wherein the attributes comprise:
  an amount of times the respective document was shared between users.

5. The method of claim 3, wherein the nodes represent businesses and wherein the attributes comprise:
  a metric of the respective business's performance.

6. The method of claim 1, wherein at least some of the node attributes are values indicating properties of edges connected to the respective node.

7. The method of claim 6, wherein the properties of edges include an amount of edges having greater than a threshold edge weight.

8. The method of claim 6, wherein the properties of edges include an amount of edges extending between clusters of the nodes.

9. The method of claim 1, wherein obtaining a designation of a given node attribute from among the plurality of node attributes comprises:
  selecting a cluster from a plurality of clusters of nodes of the graph;
  determining measures of central tendency for each of a plurality of attributes of the nodes of the selected cluster;
  determining, based at least in part on nodes outside the selected cluster, probabilities of each of the measures of central tendency arising from a sampling of nodes of the graph; and
  designating an attribute having a lowest probability among the probabilities as the given node attribute.

10. The method of claim 9, comprising:
  determining a number of nodes in the cluster, wherein:
    the measure of central tendency is a mean;
    sampling comprises forming more than 20 sample groups, each sample group having the number of nodes randomly sampled from the graph;
    determining probabilities of each of the measures of central tendency comprises:
      determining respective mean values for respective attributes of each of the respective sample groups; and
      comparing a mean value of the respective attribute of the cluster to a distribution of means of the respective attribute among the sample groups based on a mean of the mean values of the sample groups and a variance of the mean values of the sample groups.

11. The method of claim 1, wherein obtaining a designation of a given node attribute comprises steps for obtaining a designation of a given node attribute as an insightful node attribute.

12. The method of claim 1, wherein obtaining a designation of a given node attribute comprises steps for obtaining a designation of a given node attribute as an insightful node attribute based on measures of central tendency of node attributes in clusters.

13. The method of claim 1, wherein first subset is a node having a given attribute value closer to a mean value of the given attribute within a given subset of the nodes than a majority of other nodes of the given subset of nodes.

14. The method of claim 13, wherein the given subset corresponds to a cluster of nodes of the graph.

15. The method of claim 1, wherein the second subset of nodes is nodes having outlier values of the given node attribute relative to the respective clusters having nodes in the second subset.

16. The method of claim 1, wherein sending instructions to a client device to display a representation of the graph comprises:
  sending instructions to display a force directed layout of the clusters, each cluster being represented by a respective cluster icon;
  sending instructions to display a plurality of attribute icons representing the first subset and the second subset adjacent respective cluster icons of clusters including respective members of the first subset.

17. The method of claim 16, wherein:
  the cluster icons are connected by lines; and
  attribute icons corresponding to edge property attributes are arranged with respect to the lines.

18. The method of claim 16, wherein visual attributes of the attribute icons vary according to:
  whether the respective attribute icon represents a representative node for the respective attribute; and
  whether the respective attribute icon represents an outlier node for the respective attribute.

19. The method of claim 1, wherein sending instructions to a client device to display a representation of the graph comprises steps for preparing a visual representation of the graph.

20. A system, comprising:
  one or more processors; and
  memory storing instructions that when executed by at least some of the processors effectuate operations comprising:
    obtaining a clustered graph having more than 1,000 nodes and more than 2,000 edges, wherein:
      each respective edge connects a respective pair of the nodes, and
      each of the nodes has a plurality of respective node attributes other than an identifier of the node;
    obtaining a designation of a given node attribute from among the plurality of node attributes;
    identifying a first subset of nodes of the graph as having anomalous values of the given node attribute by comparing values of the given node attribute in the first subset to a distribution of the given node attribute;

identifying a second subset of nodes of the graph as having representative values of the given node attribute by comparing values of the given node attribute in the second subset to the distribution of the given node attribute; and sending instructions to a client device to display a representation of the graph, the representation of the graph comprising:

a plurality of clusters of the nodes;

visual identification of at least some nodes of the first subset as being members of the first subset; and visual identification of at least some nodes of the second subset as being members of the second subset.

* * * * *